United States Patent
Takeda et al.

(10) Patent No.: US 11,291,066 B2
(45) Date of Patent: Mar. 29, 2022

(54) USER TERMINAL, RADIO BASE STATION AND RADIO COMMUNICATION METHOD

(71) Applicant: NTT DOCOMO, INC., Tokyo (JP)

(72) Inventors: Kazuaki Takeda, Tokyo (JP); Kazuki Takeda, Tokyo (JP); Tooru Uchino, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 46 days.

(21) Appl. No.: 16/622,152

(22) PCT Filed: Jun. 13, 2017

(86) PCT No.: PCT/JP2017/021866
§ 371 (c)(1),
(2) Date: Dec. 12, 2019

(87) PCT Pub. No.: WO2018/229878
PCT Pub. Date: Dec. 20, 2018

(65) Prior Publication Data
US 2021/0153279 A1    May 20, 2021

(51) Int. Cl.
*H04L 5/00* (2006.01)
*H04W 76/16* (2018.01)
*H04W 52/24* (2009.01)
*H04W 80/02* (2009.01)

(52) U.S. Cl.
CPC ......... *H04W 76/16* (2018.02); *H04W 52/242* (2013.01); *H04W 80/02* (2013.01)

(58) Field of Classification Search
CPC .......... H04W 72/042; H04W 72/0413; H04W 72/02; H04W 88/085; H04L 5/0012; H04B 1/0475; H04B 10/25753; H04B 1/40; H04B 7/024; H04B 1/28
USPC ........................................................ 370/329
See application file for complete search history.

(56) References Cited

U.S. PATENT DOCUMENTS

2017/0164350 A1* 6/2017 Sun ...................... H04L 5/0007
2019/0141696 A1* 5/2019 Kim ..................... H04L 5/0055

OTHER PUBLICATIONS

3GPP TSG RAN WG1 Meeting #88bis; R1-1704199 "Considerations of NR UL operation for LTE-NR coexistence" Huawei, HiSilicon; Spokane, USA; Apr. 3-7, 2017 (7 pages).
3GPP TSG-RAN WG1 #89; R1-1708276 "Uplink sharing in NSA mode" Apple Inc.; Hangzhou, P.R. China; May 15-19, 2017 (6 pages).

(Continued)

*Primary Examiner* — Phuoc H Doan
(74) *Attorney, Agent, or Firm* — Osha Bergman Watanabe & Burton LLP

(57) ABSTRACT

The present invention is designed so that, in a non-standalone radio communication system, multiple UL signals of varying RATs are transmitted properly. According to the present invention, a user terminal has a transmission section that transmits both a first uplink (UL) signal of a first radio access technology (RAT) and a second UL signal of a second RAT, or a single UL signal in which the first UL signal and the second UL signal are multiplexed, by using a UL carrier of the first RAT, and a control section that controls frequency division multiplexing and/or time division multiplexing of the first UL signal and the second UL signal in the UL carrier, or multiplexing of the first UL signal and the second UL signal in the single UL signal.

5 Claims, 11 Drawing Sheets

(56) References Cited

OTHER PUBLICATIONS

Extended European Search Report issued in European Application No. 17913504.1, dated Dec. 23, 2020 (7 pages).
International Search Report issued in PCT/JP2017/021866 dated Jul. 18, 2017 (1 page).
Written Opinion of the International Searching Authority issued in in PCT/JP2017/021866 dated Jul. 18, 2017 (3 pages).
ETSI TS 136 300 V8.12.0; "LTE; Evolved Universal Terrestrial Radio Access (E-UTRA) and Evolved Universal Terrestrial Radio Access Network (E-UTRAN); Overall description; Stage 2 (3GPP TS 36.300 version 8.12.0 Release 8)"; Apr. 2010; (153 pages).
Office Action in counterpart Japanese Patent Application No. 2019-524606 dated Sep. 28, 2021 (6 pages).

\* cited by examiner

USER TERMINAL, RADIO BASE STATION AND RADIO COMMUNICATION METHOD

TECHNICAL FIELD

The present invention relates to a user terminal, a radio base station and a radio communication method in next-generation mobile communication systems.

BACKGROUND ART

In the UMTS (Universal Mobile Telecommunications System) network, the specifications of long-term evolution (LTE) have been drafted for the purpose of further increasing high speed data rates, providing lower delays and so on (see non-patent literature 1). Also, the specifications of LTE-A (also referred to as "LTE-Advanced," "LTE Rel. 10 to 13," etc.) have been drafted for further broadbandization and increased speed beyond LTE (also referred to as "LTE Rel. 8 or 9"), and successor systems of LTE (also referred to as, for example, "FRA (Future Radio Access)," "5G (5th generation mobile communication system)," "NR (New RAT (Radio Access Technology))," "LTE Rel. 14 and later versions," etc.) are under study.

In existing LTE systems (for example, LTE Rel. 10 and later versions), carrier aggregation (CA) to integrate a number of carriers (component carriers (CCs), cells, and so forth) is introduced in order to achieve broadbandization. Each carrier is configured with the system bandwidth of LTE Rel. 8 as 1 unit. In addition, in CA, multiple CCs under the same radio base station (eNB (eNodeB)) are configured in a user terminal (UE (User Equipment)).

Meanwhile, in existing LTE systems (for example, LTE Rel. 12 and later versions), dual connectivity (DC), in which a number of cell groups (CGs) formed by different radio base stations are configured in a user terminal, is also introduced. Every cell group is comprised of at least 1 carrier (also referred to as "CC," "cell," etc.). In DC, a number of carriers of different radio base stations are integrated, so that DC is also referred to as "inter-eNB CA."

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall Description; Stage 2 (Release 8)," April, 2010.

SUMMARY OF INVENTION

Technical Problem

In future radio communication systems (for example, 5G, NR, etc.), RATs (also referred to as "5G," "NR," "second RAT," etc.) that are different from existing radio access technologies (RATs) (also referred to as "LTE," "first RAT," etc.) will be adopted. Also, as for the mode of operation in future radio communication systems, stand-alone mode, which operates independently without coordinating with existing RAT, and non-stand-alone mode (NSA), which operates by coordinating with existing RAT, are anticipated.

In non-stand-alone radio communication systems (also referred to as "NR NSA" and the like), multiple carriers of different RATs (or a number of cell groups that are each comprised of multiple carriers (cells) of different RATs) are configured in a user terminal (also referred to as "UE (User Equipment)," "NR UE," etc.). Furthermore, envisaging non-stand-alone radio communication systems, research is underway to allow a user terminal to simultaneously connect with multiple carriers (also referred to as "multiple cell groups," "multiple cells," "multiple CCs," etc.) of different RATs (dual connectivity (DC)).

However, in non-stand-alone radio communication systems, even when an attempt is made to connect with a number of carriers of different RATs simultaneously and transmit multiple UL signals of different RATs using each of these multiple carriers, there is a high possibility that the plurality of UL signals cannot be transmitted properly.

The present invention has been made in view of the above, and it is therefore an object of the present invention to provide a user terminal, a radio base station and a radio communication method, whereby multiple UL signals of different RATs can be transmitted properly in non-stand-alone radio communication systems.

Solution to Problem

A user terminal according to one aspect of the present invention has a transmission section that transmits both a first uplink (UL) signal of a first radio access technology (RAT) and a second UL signal of a second RAT, or a single UL signal in which the first UL signal and the second UL signal are multiplexed, by using a UL carrier of the first RAT, and a control section that controls frequency division multiplexing and/or time division multiplexing of the first UL signal and the second UL signal in the UL carrier, or multiplexing of the first UL signal and the second UL signal in the single UL signal.

Advantageous Effects of Invention

According to the present invention, a user terminal can properly transmit multiple UL signals of different RATs in non-stand-alone radio communication systems.

DESCRIPTION OF EMBODIMENTS

Figure 1:
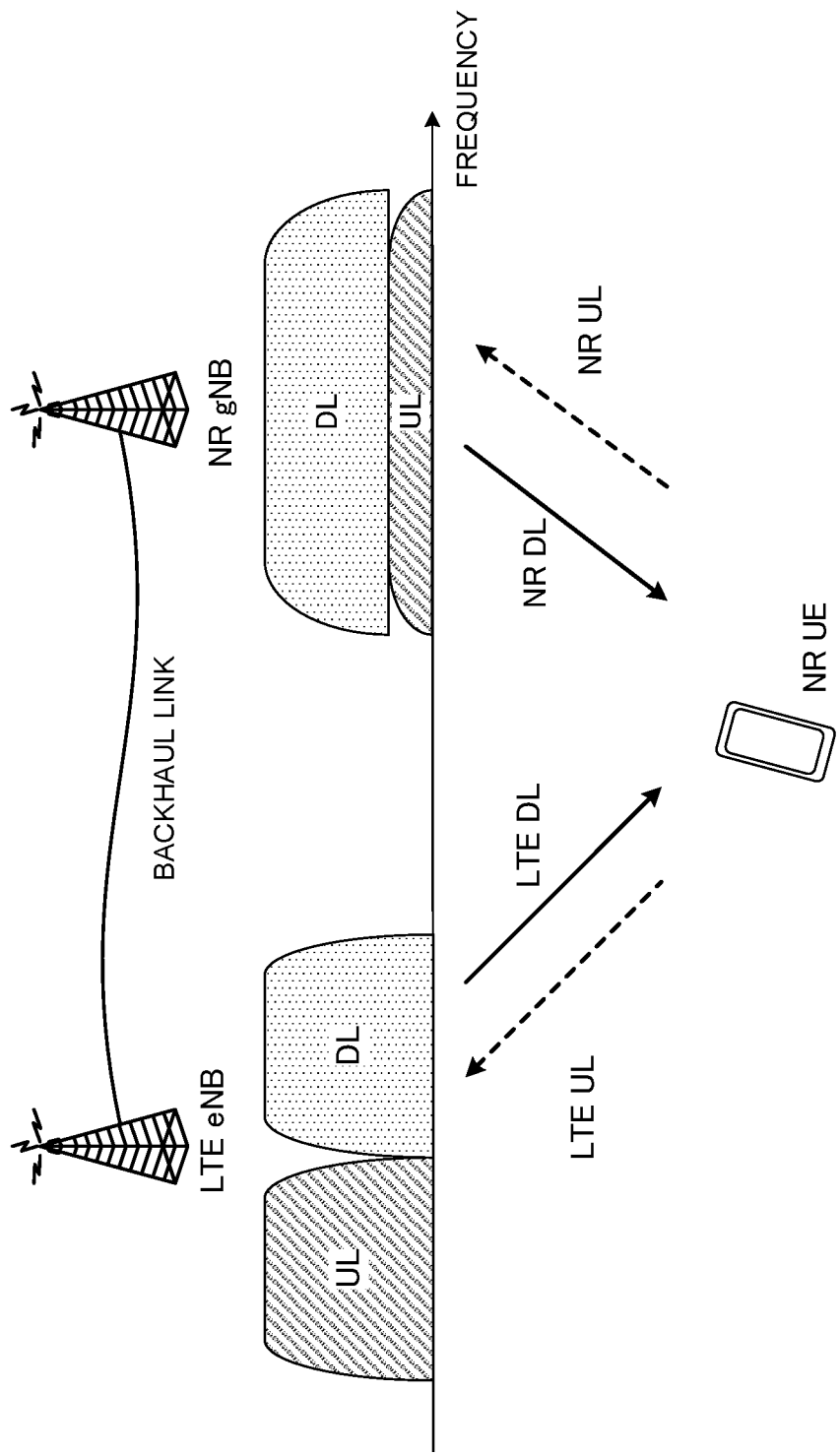
FIG. 1 is a diagram to show an example of a non-stand-alone radio communication system.

FIG. 1 is a diagram to show an example of a non-stand-alone radio communication system. As shown in FIG. 1, in non-stand-alone radio communication systems, one or more carriers for LTE (also referred to as "LTE carriers," "LTE cells," "first carriers," etc.) and one or more carriers for NR (also referred to as "NR carriers," "NR cells," "second carriers," etc.) are configured in a user terminal (NR UE).

These one or more LTE carriers (also referred to as a "cell group," "LTE cell group," "primary cell group (PCG)," etc.) may include one or more DL carriers (also referred to as "LTE DL carriers," "first DL carriers," etc.) and/or one or more UL carriers (also referred to as "LTE UL carriers," "first UL carriers," etc.).

In addition, these one or more NR carriers (also referred to as a "cell group," "NR cell group," "secondary cell group (SCG)," etc.) may include one or more DL carriers (also referred to as "NR DL carriers," "second DL carriers," etc.) and/or one or more UL carriers (also referred to as "NR UL carriers," "second UL carriers," etc.).

As shown in FIG. 1, one or more LTE carriers and one or more NR carriers are all allocated to different frequency bands. An LTE carrier may be allocated to a relatively low frequency band such as, for example, at least one of 800 MHz, 1.7 GHz and 2.1 GHz. Also, an NR carrier may be allocated to a relatively high frequency band such as, for example, 3 GHz or higher.

For example, in FIG. 1, frequency division duplexing (FDD) is applied to LTE, so that the LTE UL carrier and the LTE DL carrier are provided at different frequencies. Also, given that time division duplexing (TDD) is applied to NR, the NR UL carrier and the NR DL carrier may be provided at the same frequency. Note that FIG. 1 is simply an example, and it is equally possible to apply TDD to LTE, and apply FDD to NR. Also, although cases are shown here in which 1 LTE carrier and 1 NR carrier are present, but two or more LTE carriers and NR carriers may be present as well.

Furthermore, in FIG. 1, the radio base station of LTE (also referred to as "eNodeB (eNB)," "LTE eNB," "LTE base station," etc.) and the radio base station of NR (also referred to as "gNodeB (gNB)," "NR gNB," "NR base station," etc.) are connected via a backhaul link (for example, a wired link such as the X2 interface or a wireless link). Note that the LTE base station and the NR base station may be installed at the same location, or may be installed at different locations that are geographically apart.

Now, for the non-stand-alone radio communication system shown in FIG. 1, studies are in progress to allow a user terminal to connect with the LTE DL carrier and the NR DL carrier simultaneously (this is also referred to as "LTE-NR dual connectivity," etc.).

To be more specific, referring still to FIG. 1, studies are underway to allow a user terminal to receive, simultaneously, DL signals of LTE (also referred to as "LTE DL signals," "first DL signals," etc.) and DL signals of NR (also referred to as "NR DL signals," "second DL signals," etc.) by using both the LTE DL carrier and the NR DL carrier. In addition, studies are underway to allow a user terminal to transmit, simultaneously, UL signals of LTE (also referred to as "LTE UL signals," "first UL signals," etc.) and UL signals of NR (also referred to as "NR UL signals," "second UL signals," etc.) by using both the LTE UL carrier and the NR UL carrier.

However, when the LTE UL carrier and the NR UL carrier run dual connectivity, there is a possibility that an LTE UL signal and an NR UL signal cannot be transmitted properly by using the LTE UL carrier and the NR UL carrier separately.

For example, the coverage of a high frequency band is smaller than the coverage of a low frequency band. It then follows that, when an LTE UL signal and an NR UL signal are transmitted simultaneously by using the LTE UL carrier, which uses a low frequency band, and the NR UL carrier, which uses a high frequency band, the coverage of the NR UL signal, which is smaller than the coverage of the LTE UL signal, poses a problem.

Also, when an LTE UL signal and an NR UL signal are transmitted simultaneously by using the LTE UL carrier of a low frequency band (for example, 1.7 GHz) and the NR UL carrier of a high frequency band (for example, 3.5 GHz) separately, there is a possibility that the performance of DL will decline due to inter-modulation that takes place in user terminals.

So, presuming a non-stand-alone radio communication system in which multiple carriers of different RATs are configured in a user terminal, the present inventors have come up with the idea of allowing this user terminal to transmit multiple UL signals of different RATs by using one of the multiple carriers (allowing UL signals of multiple RATs to co-exist in a single RAT carrier).

Now, embodiments of the present invention will be described below in detail with reference to the accompanying drawings. Note that, although, in the following description, one or more LTE carriers and one or more NR carriers will be configured in a user terminal, multiple carriers according to the present embodiment are by no means limited to LTE carriers and NR carriers, as long as multiple carriers of varying RATs are used.

Figure 2:
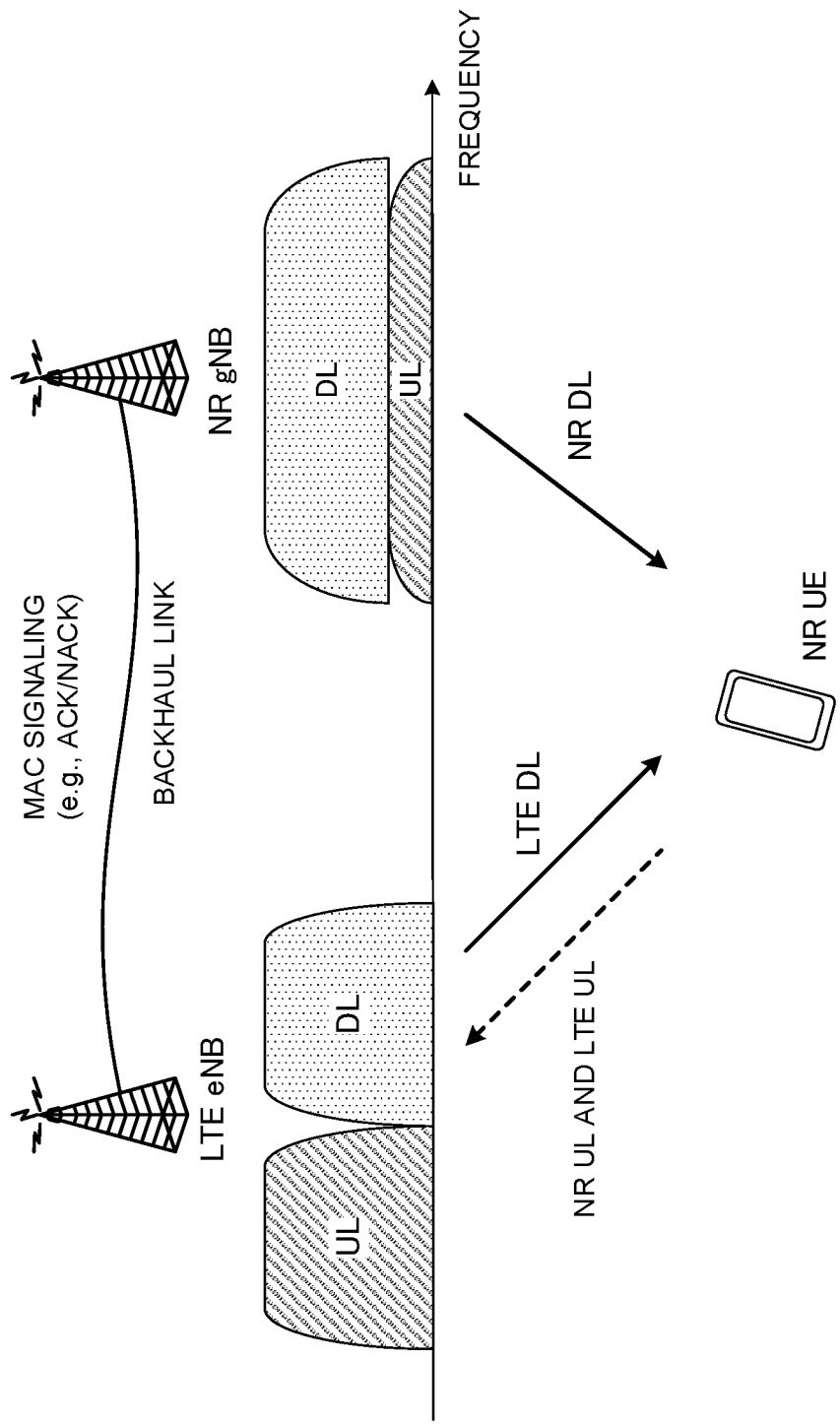
FIG. 2 is a diagram to show an example of a non-stand-alone radio communication system according to the present embodiment.

FIG. 2 is a diagram to show an example of a non-stand-alone radio communication system according to the present embodiment. As has been described with reference to FIG. 1, FIG. 2 also shows a case in which FDD is used in LTE and TDD is used in NR, but this is simply an example, and is by no means limiting. Now, differences from FIG. 1 will be primarily described below.

In FIG. 2, the LTE base station and the NR base station both have MAC (Medium Access Control) entities. A MAC entity refers to a processing entity that performs MAC layer processing. MAC layer processing includes, for example, at least one of multiplexing of logical channels, retransmission control (HARQ (Hybrid Automatic Repeat reQuest)), scheduling, multiplexing of data across multiple carriers (CCs) and demultiplexing of the data.

Referring to FIG. 2, a user terminal (NR UE) connects with an LTE DL carrier and an NR DL carrier simultaneously (dual connectivity). Here, the user terminal can receive LTE DL signals and NR DL signals from the LTE base station and the NR base station, simultaneously, by using both the LTE DL carrier and the NR DL carrier.

Meanwhile, the user terminal transmits both LTE UL signals and NR UL signals, to the LTE base station, by using the LTE UL carrier. The LTE base station receives LTE UL signals and NR UL signals from the user terminal by using the LTE UL carrier. In this way, transmission of both LTE UL signals and NR UL signals on an LTE UL carrier is also referred to as "co-existence," "NR-LTE co-existence," and/or the like.

Referring to FIG. 2, LTE UL signals and NR UL signals that are transmitted using the LTE UL carrier may be physical-layer UL signals (also referred to as "L1 signals," "UL channels," "physical UL channels," etc.) belonging to different MAC entities of different RATs.

For example, LTE UL signals may be at least one of PUCCH (Physical Uplink Control CHannel), PUSCH (Physical Uplink Shared CHannel), PRACH (Physical Random Access CHannel), UL data and uplink control information (UCI). Also, NR UL signals may be, for example, at least one of an NR UL control channel (also referred to as "NR-PUCCH" and the like), a UL data channel (also referred to as a "UL shared channel," "NR-PUSCH," etc.), a random access channel, UL data and UCI.

In FIG. 2, LTE DL signals may be, for example, at least one of PDCCH (Physical Downlink Control CHannel), EPDCCH (Enhanced PDCCH), PDSCH (Physical Downlink Shared CHannel), downlink control information (DCI) and DL data. Also, NR DL signals may be, for example, at least one of an NR DL control channel (also referred to as "NR-PDCCH," etc.), a DL data channel (also referred to as a "DL shared channel," "NR-PDSCH," etc.), DCI, and DL data.

Also, when LTE UL signals and NR DL signals are transmitted on the LTE UL carrier, coordination may be made between the LTE base station and the NR base station in higher layer (for example, the MAC layer).

To be more specific, the LTE base station (for example, a MAC entity in the LTE base station) may process an NR UL signal received from a user terminal, and communicate uplink control information (UCI) for NR and/or UL data (UCI/UL data), to the NR base station, by using MAC signaling (also referred to as "MAC information," "MAC control element (MAC CE)," etc.) via the X2 interface and/or the like. The NR base station (for example, a MAC entity in the NR base station) may process the MAC signal from the LTE base station, and control NR DL signals and/or NR UL signals based on UCI.

For example, in the event UCI transferred from the LTE base station contains at least one of delivery acknowledgment information (also referred to as "ACK/NACK," "A/N," "HARQ-ACK," etc.) in response to NR DL signals, channel state information (CSI) and beam information (BI), the NR base station may control at least one of retransmission control, scheduling and beams for NR DL signals based on the ACK/NACK and/or the CSI. Also, when this UCI contains an NR UL signal scheduling request (SR), the NR base station may control the scheduling of an NR UL signal based on this SR.

Also, the NR base station may transmit UL data transferred from the LTE base station to devices in the NR core network.

As shown in FIG. 2, when both NR UL signals and LTE UL signal are transmitted using an LTE UL carrier of a low frequency band, the coverage of NR UL signals can be made equal to the coverage of LTE UL signals. In addition, it is possible to prevent the deterioration of DL performance due to inter-modulation, which takes place when multiple UL signals are transmitted simultaneously in different frequency bands.

Note that, in FIG. 2, both LTE UL signals and NR UL signals are transmitted using the LTE UL carrier, but these signals may be transmitted using the NR UL carrier, instead of the LTE UL carrier. In this case, the NR base station (for example, a MAC entity of the NR base station) may communicate UCI/UL data for LTE, to the LTE base station, through MAC signaling. Also, the user terminal may determine whether or not to transmit LTE UL signals and NR UL signals by using the NR UL carrier, based on the path loss (PL) of NR DL signals.

(Control of Multiplexing of Multiple UL Signals of Different RATs)

Next, control of multiplexing of multiple UL signals (for example, LTE UL signals and NR UL signals) of different RATs in a single UL carrier will be described. In the event a single UL carrier is used, multiple UL signals may be frequency-division-multiplexed and/or time-division-multiplexed and transmitted. Alternatively, these multiple UL signals may be multiplexed over a single UL signal of a single UL carrier, and this single UL signal may be transmitted.

FIG. 3 provide diagrams to show examples of multiplexing of LTE UL signals and NR UL signals according to the present embodiment. Note that FIG. 3 exemplify LTE UL carriers in the non-stand-alone radio communication system shown in FIG. 2.

Figure 3A:
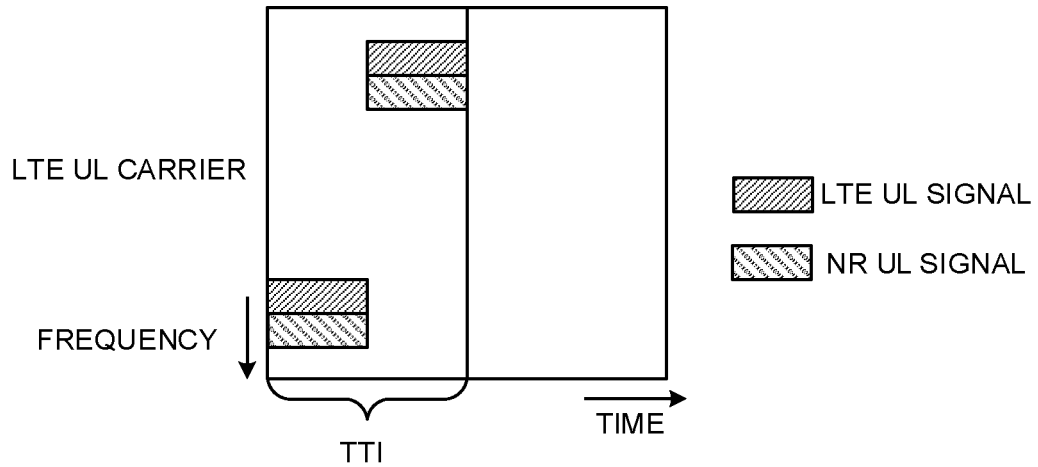
FIGS. 3A to 3C are diagrams to show examples of multiplexing of LTE UL signals and NR UL signals in LTE UL carriers according to the present embodiment.

As shown in FIG. 3A, an LTE UL signal and an NR UL signal transmitted in an LTE UL carrier may be frequency-division-multiplexed (FDM). Note that, in FIG. 3A, frequency hopping is applied to the LTE UL signal and the NR UL signal within a predetermined period of time (for example, within 1 TTI), but it is also possible not to apply frequency hopping. In the event FDM is used, an LTE UL signal and an NR UL signal may be generated based on OFDM (Orthogonal Frequency Division Multiplexing).

Figure 3B:
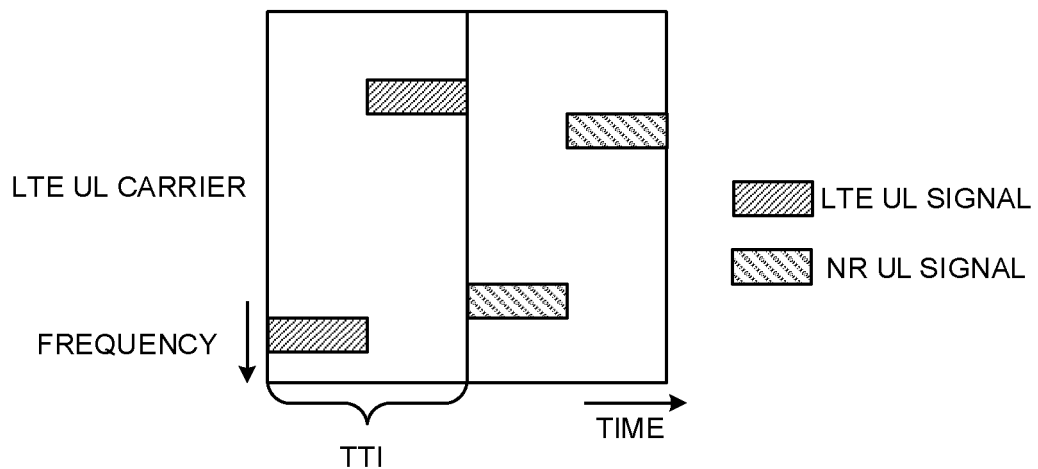

Alternatively, as shown in FIG. 3B, an LTE UL signal and an NR UL signal to be transmitted in an LTE UL carrier may be time-division-multiplexed (FDM). Note that, in FIG. 3B, too, frequency hopping is applied to the LTE UL signal and the NR UL signal within a predetermined period of time (for example, within 1 TTI), but it is equally possible not to apply frequency hopping. In the event TDM is used, an LTE UL signal and an NR UL signal may be generated based on DFT-spreading OFDM (DFT-s-OFDM (Discrete Fourier Transform-Spreading-OFDM)). This can achieve low PAPR, so that TDM can expand the coverage more than FDM can.

Moreover, in the event TDM is used as shown in FIG. 3B, subcarrier alignment between the LTE UL signal and NR UL signal, required in the event FDM is used as shown in FIG. 3A, can be avoided. To maintain the PAPR-lowering effect of DFT-spreading OFDM (DFT-s-OFDM) and cancel the impact of the direct-current (DC) component, the subcarrier of the LTE UL signal is shifted by 7.5 kHz (half-subcarrier shifting). As for the NR UL signal, the impact of DC may be cancelled by way of implementation (a shift of 7.5 kHz is not applied, unlike the LTE UL signal). Consequently, in the event FDM is used, subcarrier alignment is required between the LTE UL signal and the NR UL signal, but this subcarrier alignment is not necessary when TDM is used.

Figure 3C:
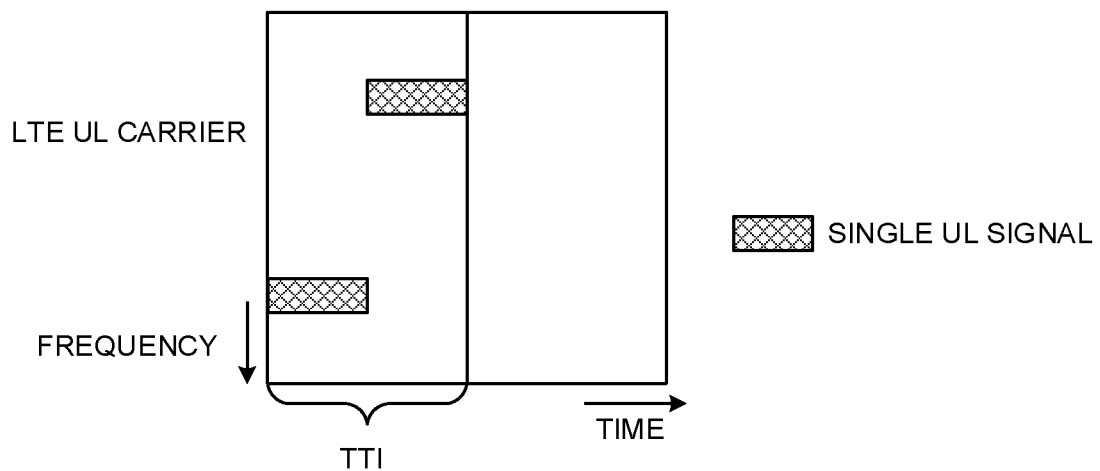

Alternatively, as shown in FIG. 3C, an LTE UL signal and an NR UL signal that are transmitted in the LTE UL carrier may be multiplexed over a single UL signal (also referred to as "L1 signal," "UL channel," "physical UL channel," etc.). This single UL signal may be, for example, PUCCH format 4, which uses multiple resource blocks (PRBs (Physical Resource Blocks)), PUCCH format 5, in which the spreading factor is lower than PUCCH format 3, a new PUCCH format, a PUSCH, or a newly defined UL channel.

(RRC Signaling)

The LTE base station or the NR base station may report information about the multiplexing of the LTE UL signal and the NR UL signal (multiplexing information) to the user terminal through higher layer signaling (for example, RRC signaling). The multiplexing information may show whether the LTE UL signal and the NR UL signal are separately frequency-division-multiplexed (see FIG. 3A) and/or time-division-multiplexed (see FIG. 3B), or whether the LTE UL signal and the NR UL signal are multiplexed as a single UL signal (see FIG. 3B).

(Random Access)

Even when an LTE UL signal and an NR UL signal are multiplexed and transmitted in the LTE UL carrier as described above, the user terminal may temporally switch between the transmission of the LTE UL signal and the transmission of the NR UL signal over time during random access procedures.

(Retransmission Control)

Retransmission of LTE DL signals is controlled in units of transport blocks (TBs). To be more specific, even when the LTE base station segments and encodes TBs corresponding to LTE DL signals into one or more code blocks (CBs) each, the user terminal transmits ACKs/NACKs on a per TB basis, to the LTE base station.

Retransmission of NR DL signals, on the other hand, does not have to be controlled on a per TB basis, but may be controlled per code block group (CBG) comprised of one or more CBs. 1 TB contains one or more CBGs. To be more specific, when the NR base station segments and encodes TBs corresponding to NR DL signal into one or more CBs each, the user terminal may transmit ACKs/NACKs, as feedback, on a per TB basis, or on a per CBG basis. The NR base station retransmits TBs in response to TB-based ACKs/NACKs, and retransmits CBGs in response to CBG-based ACKs/NACKs.

In this way, the granularity of ACKs/NACKs for NR DL signals (NR A/Ns) (TB-based granularity or CBG-based granularity) may be the same as or different from the granularity of ACKs/NACKs for LTE DL signals (LTE A/Ns). In this way, when the user terminal transmits ACKs/NACKs in response to multiple DL signals of different RATs on a single UL carrier, the granularity of ACKs/NACKs in response to multiple DL signals may vary, or may be fixed to the same granularity.

Figure 4A:
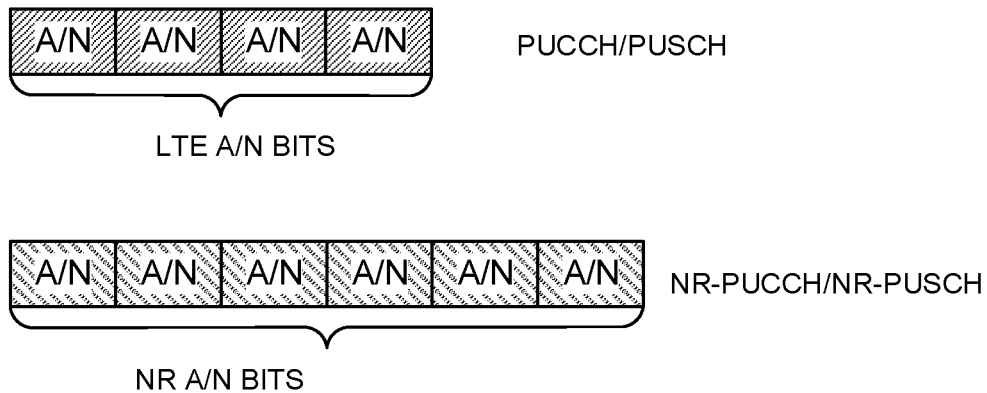
FIGS. 4A to 4C are diagrams to show examples of LTE A/N bits and NR A/N bits according to the present embodiment.

FIG. 4 are diagrams to show examples of LTE A/N bits and NR A/N bits according to the present embodiment. FIG. 4A shows a case in which LTE A/N bits and NR A/N bits are separately transmitted in an LTE UL signal and an NR UL signal, respectively, in an LTE UL carrier (see FIGS. 3A and 3B).

In the case shown in FIG. 4A, the LTE A/N bits and the NR A/N bits are transmitted in different UL channels, respectively, and therefore the LTE A/N bits and the NR A/N bits may be based on TBs alike. Alternatively, the LTE A/N bits may be based on TBs, while the NR A/N bits may be based on CBGs. That is, in FIG. 4A, the granularity of the NR A/N bits need only be the granularity preconfigured to the user terminal.

Figure 4B:
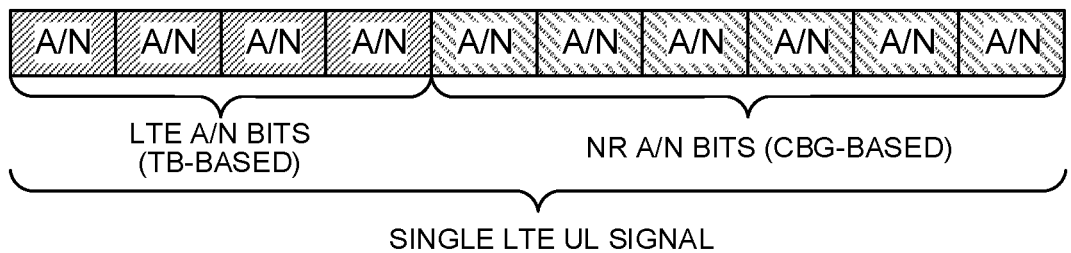
Figure 4C:
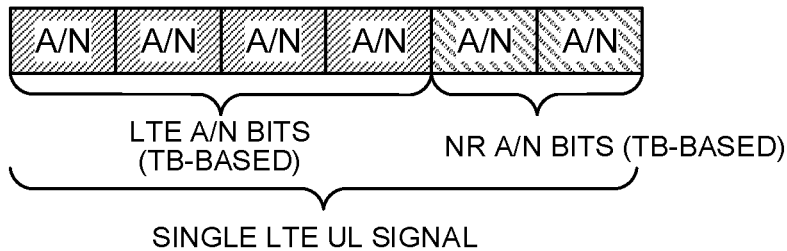

On the other hand, FIGS. 4B and 4C each show a case in which LTE A/N bits and NR A/N bits are multiplexed over a single UL signal of the LTE UL carrier and transmitted (see FIG. 3C). As shown in FIGS. 4B and 4C, when LTE A/N bits and NR A/N bits are multiplexed over a single UL signal, the user terminal may control the granularity (TB-based granularity or CBG-based granularity) for retransmitting NR DL signals using the NR DL carrier.

For example, FIGS. 4B and 4C assume that the LTE base station shown in FIG. 2 transmits 4 TBs using the LTE DL carrier, the NR base station transmits 2 TBs using the NR DL carrier, and these 2 TBs each contain 3 CBGs (that is, a total of 6 CBGs).

As shown in FIG. 4B, when different granularities are allowed between LTE A/Ns and NR A/Ns, 4 LTE A/N bits based on the decoding results of the 4 TBs and 6 NR A/N bits based on the decoding results of the 6 CBGs may be multiplexed over a single LTE UL signal. When using CBG-based NR A/N bits, retransmission of NR DL signals can be controlled in a more detailed way than when TB-based NR A/N bits are used.

As shown in FIG. 4C, when different granularities are not allowed between LTE A/Ns and NR A/Ns, 4 LTE A/N bits based on the decoding results of the 4 TBs and 2 NR A/N bits based on the decoding results of 2 TBs, which are comprised of 6 CBGs, may be multiplexed over a single LTE UL signal. In FIG. 4C, even if the granularity of NR A/Ns is configured based on CBGs, the user terminal may fall back to the TB-based granularity. As shown in FIG. 4C, when using TB-based NR A/N bits, the overhead can be reduced compared to when using the CBG-based NR A/N bits of FIG. 4B.

Also, as shown in FIGS. 4B and 4C, the A/N region may be split into LTE A/Ns and NR A/Ns. Information about the A/N region (A/N region information) may be reported to the user terminal via higher layer signaling or DCI by using an LTE DL carrier. This A/N region information may include, for example, at least one of information to show the number of LTE A/N bits, information to show the number of NR A/N bits, and information to show the granularity of NR A/Ns (for example, TBs or CBGs). Note that the user terminal may determine the granularity of NR A/Ns (TB-based granularity or CBG-based granularity) based on the number of bits allocated to NR A/Ns.

Note that FIGS. 4B and 4C are simply examples, and the present invention is not limited to these. For example, in FIG. 4C, TB-based A/Ns are used in order to reduce the number of NR A/N bits, but one or more A/Ns may be bundled (or may be calculated using the logical product (AND)). For example, A/Ns associated with one or more CBGs and/or one or more TBs may be bundled.

As described above, when the granularity (TB-based granularity or CBG-based granularity) for retransmitting NR DL signals by using an NR DL carrier is controlled, A/N bits can be generated properly even when the granularity of NR DL signals is configured differently than LTE DL signals.

<Transmission Power Control>

The transmission power of LTE UL signals using the LTE UL carrier is determined based on the path loss of LTE DL signals. Also, the transmission power of NR UL signals using the NR UL carrier is determined based on the path loss of NR DL signals.

Meanwhile, if the transmission power of an NR UL signal that is transmitted using the LTE UL carrier (see FIGS. 3A and 3B) is to be determined based on the path loss of an NR DL signal, there is a possibility that the transmission power of this NR UL signal cannot be determined properly. So, the user terminal may control the transmission power of an NR UL signal that is transmitted using the LTE UL carrier (see FIGS. 3A and 3B) based on the path loss of an LTE DL signal, instead of the path loss of an NR DL signal.

Also, the user terminal may control the transmission power of a single UL signal where an NR UL signal and an LTE UL signal are multiplexed (see FIG. 3C) to which based on the path loss of an LTE DL signal, instead of the path loss of an NR DL signal.

As described above, the transmission power of the LTE UL carrier's NR UL signal (or a UL signal where an NR UL signal is multiplexed) is controlled based on the path loss of an LTE DL signal, so that, even when the NR UL signal is transmitted using a UL carrier (LTE UL carrier) of a different RAT, the transmission power of the NR UL signal can still be controlled properly.

(Priority Control)

Next, when UCI for LTE and UCI for NR are transmitted using the LTE UL carrier, the priority of the UCI for LTE and/or the UCI for NR may be controlled based on predetermined rules.

For example, assuming that, as shown in FIG. 3B, an LTE UL signal and an NR UL signal are time-division-multiplexed in the LTE UL carrier, the timing for transmitting an A/N for LTE as feedback and the timing for transmitting the NR UL signal overlap, and the user terminal may transmit the A/N for LTE A/N, and drop the NR UL signal. Also, when, as shown in FIG. 3C, an LTE UL signal and an NR UL signal are multiplexed over a single UL signal of the LTE UL carrier, the user terminal may drop, at least partially, the UCI for LTE and/or the UCI for NR.

(Backhaul Link)

When the user terminal transmits an LTE UL signal and an NR UL signal by using the LTE UL carrier, the LTE base station transmits at least one of UCI for NR and/or control information related to UL data (NR control information), to the NR base station, via an interface for between radio base stations of different RATs (for example, the X2 interface).

This NR control information may include, for example, at least one of information to show the number of NR A/N bits, information to show the number of carriers (cells) in NR, information to show the number of CBGs, information to show numerologies for NR (for example, at least one of subcarrier spacing, the length of symbols and the length of cyclic prefixes), and information to show the timing at which the NR base station can schedule DL data. For example, the NR control information may be transmitted by using X2 signaling.

(MAC Entity)

As shown in FIG. 2, when the user terminal connects with the LTE DL carrier and the NR DL carrier simultaneously (dual connectivity), the user terminal may configure (set) MAC entities on a per carrier basis (where a carrier may be also referred to as a "frequency," a "CC," a "cell group," etc.). On the other hand, when a single MAC entity is configured per carrier, there is a risk that transmission of multiple UL signals of different RATs (for example, an LTE UL signal and an NR UL signal) cannot be controlled properly within a single UL carrier (for example, the LTE UL carrier).

Therefore, studies are in progress to configure multiple MAC entities for a single carrier (also referred to as a "frequency," a "CC," a "cell group," etc.) and share information (state information) related to the state of each MAC entity among these multiple MAC entities.

Figure 5A:
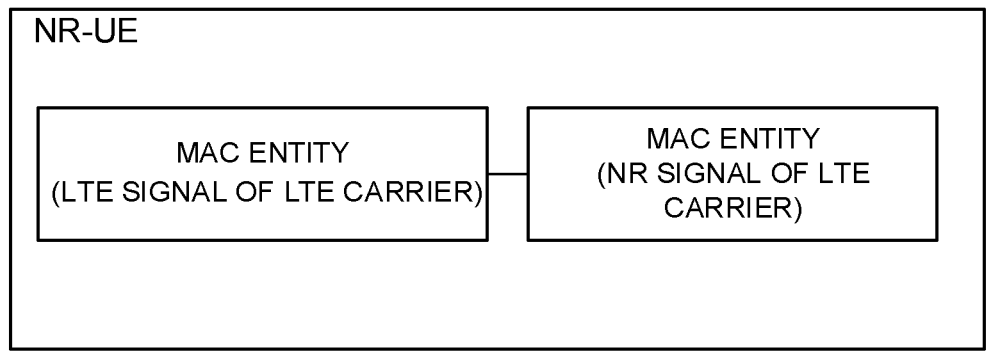
FIGS. 5A to 5C are diagrams to show examples of MAC entity configurations in a user terminal according to the present embodiment.
Figure 5B:
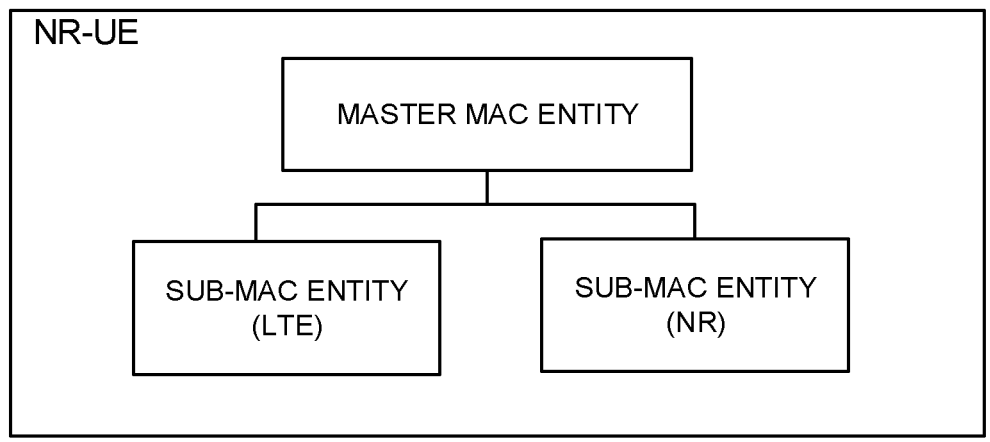
Figure 5C:
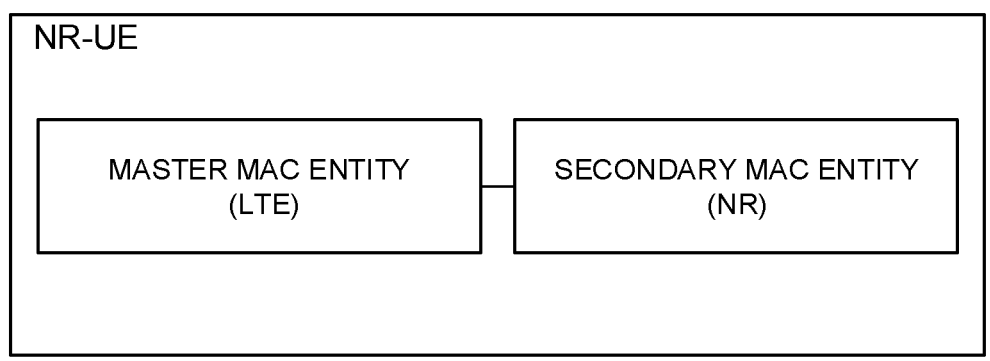

FIG. 5 are diagrams to show examples of MAC entity configurations in a radio communication system according to the present embodiment. In FIGS. 5A to 5C, as shown in FIG. 2, an LTE UL signal and an NR UL signal (or a UL signal in which an LTE UL signal and an NR UL signal are multiplexed) are transmitted on the LTE UL carrier. Note that, although not illustrated, in FIGS. 5A to 5C, a MAC entity may be configured for NR signals to be transmitted/received on the NR carrier.

In the example shown in FIG. 5A, one or more MAC entities are configured per carrier. For example, as shown in FIG. 5A, the user terminal may configure multiple MAC entities for the LTE carrier (here, a MAC entity for LTE signals (LTE DL signals and/or LTE UL signals), a MAC entity for NR signals (NR DL signals and/or NR UL signals)).

In this way, in FIG. 5A, even when the carrier is the same, multiple MAC entities are configured, separately, if the RAT varies. Each MAC entity is controlled on the same level (controlled independently). State information may be shared and/or mutually reported among the multiple MAC entities.

FIG. 5B shows an example, in which a single master MAC entity and one or more sub-MAC entities are configured. For example, as shown in FIG. 5B, the user terminal may configure a master MAC entity, a sub-MAC entity for LTE signals and a sub-MAC entity for NR signals.

In the case illustrated in FIG. 5B, the master MAC entity controls each sub-MAC entity. State information may be shared and/or mutually reported between the master MAC entity and each sub-MAC entity. Note that sub-MAC entities may be provided per RAT, regardless of the carrier (frequency), or may be provided per carrier and per RAT, similar to the MAC entities shown in FIG. 5A.

FIG. 5C shows an example in which a master MAC entity and one or more secondary MAC entities are configured. For example, as shown in FIG. 5C, the user terminal may configure a master MAC entity for LTE and a secondary MAC entity for NR.

In FIG. 5C, the master MAC entity may primarily control the user terminal, and the secondary MAC entity may control specific NR-related processes (for example, at least one of generation, transmission, and receipt of NR signals). State information may be shared and/or mutually reported between the master MAC entity and the secondary MAC entity.

Next, what state information is shared among multiple MAC entities of the same carrier (FIG. 5A), between the master MAC entity and each sub-MAC entity (FIG. 5B), or between the master MAC entity and the secondary MAC entity will be described below. In addition, common control among a plurality of MAC entities using the state information will be described below.

As used in the following description, a "MAC entity" may refer to at least one of a MAC entity (FIG. 5A), a master MAC entity (FIGS. 5B and 5C), a sub-MAC entity (FIG. 5B), and a secondary MAC entity (FIG. 5C).

For example, the state information may include at least one of information about discontinuous receipt (DRX) (DRX information), information about the transmission state of scheduling request (SR) (SR information), information about buffer status (buffer status information), information about UL timing alignment (UL timing alignment information), and information about the reset state of MAC entities (reset information).

Here, the DRX information may represent, for example, at least one of the cycle of DRX and PDCCH monitoring occasions. In one MAC entity, DRX information related to other MAC entities may be reported. The timing of DRX (at least one of the cycle, the duration and the offset) may be controlled the same between MAC entities.

Each MAC entity may control the transmission of SRs in that MAC entity itself based on SR information pertaining to other MAC entities. For example, if DCI (UL grant) in response to an SR is received in a given carrier, each MAC entity may cancel the SR.

Also, to a given MAC entity, buffer status information pertaining to other MAC entities (for example, the MAC entity for NR signals of the LTE carrier, sub-MAC entity, or secondary MAC entity) may be reported. Also, the UL timing may be controlled in common between multiple MAC entities.

For example, if a UL timing is established in a given MAC entity, this UL timing may be applied to other MAC entities as well. Also, when a timing advance (TA) command is received in a given MAC entity, this TA command may be applied to all the MAC entities. Also, when the TA timer expires in a given MAC entity, other MAC entities may also make their own TA timers expire.

Also, the reset may be controlled in common among multiple MAC entities (for example, among multiple MAC entities of the same carrier (FIG. 5A), between the master MAC entity and the sub-MAC entity (FIG. 5B), or between the master MAC entity and the secondary MAC entity).

For example, when one MAC entity (for example, the MAC entity for LTE signals of the LTE carrier or the master MAC entity) is reset, other MAC entities (for example, the MAC entity for NR signals of the LTE carrier, sub-MAC entity or secondary MAC entity) may also be reset.

As described above, when one or more MAC entities are configured for a single carrier (also referred to as a "frequency," a "CC," a "cell group," etc.) and state information is shared among these multiple MAC entities, the transmission of multiple UL signals of different RATs can be controlled properly in a single carrier.

(Radio Communication System)

Now, the structure of a radio communication system according to the present embodiment will be described below. In this radio communication system, each radio communication method according to the above-described embodiments is employed. Note that the radio communication methods according to the herein-contained examples of the present invention may be applied individually, or may be combined and applied.

Figure 6:
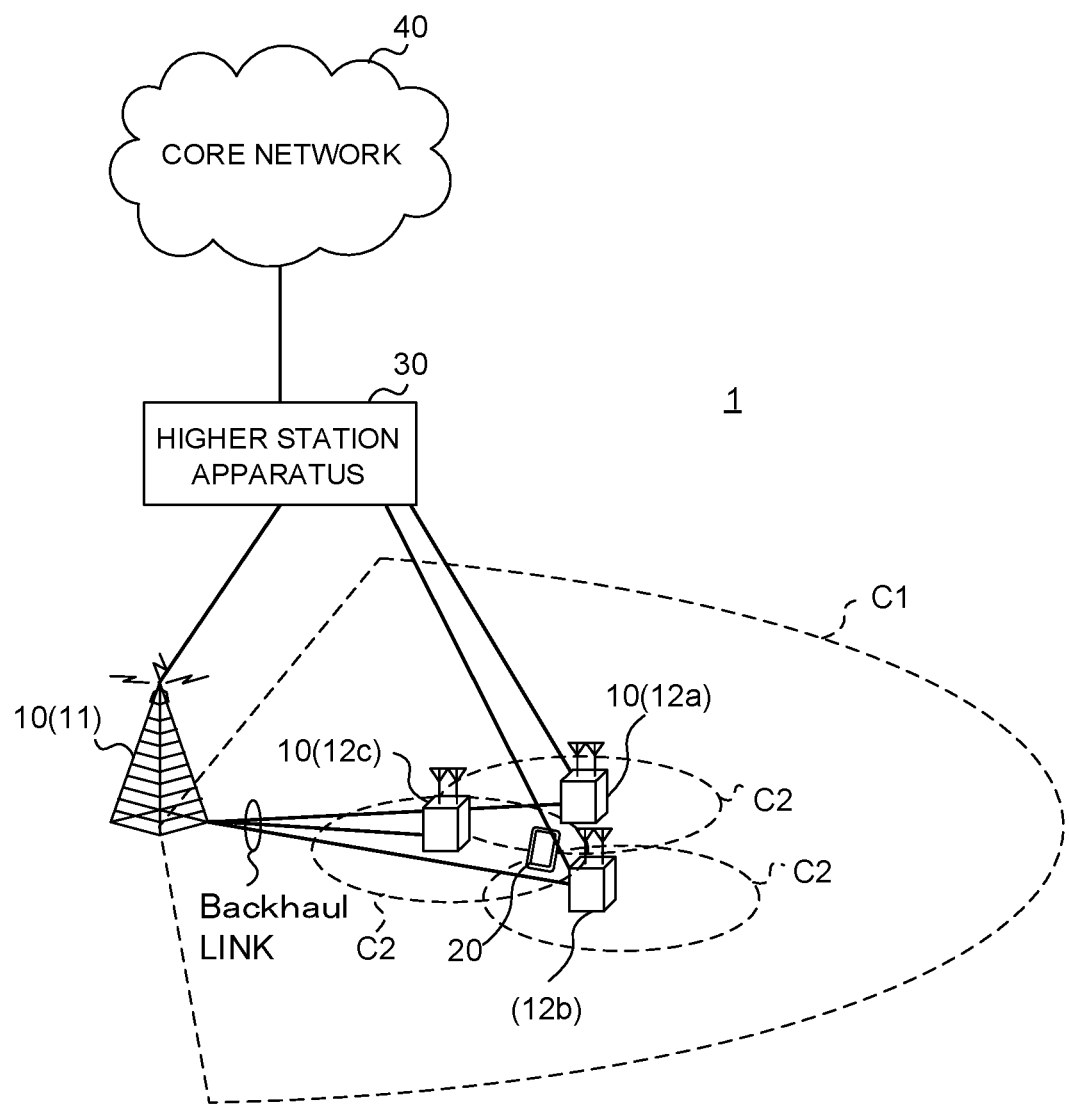
FIG. 6 is a diagram to show an exemplary schematic structure of a radio communication system according to the present embodiment.

FIG. 6 is a diagram to show an exemplary schematic structure of a radio communication system according to the present embodiment. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes 1 unit. Note that the radio communication system 1 may be a non-stand-alone type (NR NSA), in which an existing RAT (for example, SUPER 3G, LTE-A (LTE-Advanced), IMT-Advanced or 4G)) and a new RAT (for example, 5G, FRA (Future Radio Access) or NR (New RAT)) run together.

The radio communication system 1 shown in FIG. 6 includes a radio base station 11 that forms a macro cell C1, and radio base stations 12a to 12c that are placed within the macro cell C1 and that form small cells C2, which are narrower than the macro cell C1. Also, user terminals 20 are placed in the macro cell C1 and in each small cell C2. A structure in which different RAT and/or numerologies are used between cells may be adopted. Note that numerologies may be RAT-specific communication parameters (for example, at least one of subcarrier spacing, the length of symbols, the length of CPs, the length of TTIs, etc.).

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can run CA or DC by using a plurality of cells (CCs) (for example, 2 or more CCs). Furthermore, the user terminals can use license band CCs and unlicensed band CCs as a plurality of cells.

Furthermore, the user terminal 20 can perform communication using time division duplexing (TDD) or frequency division duplexing (FDD) in each cell. A TDD cell and an FDD cell may be referred to as a "TDD carrier (frame configuration type 2)," and an "FDD carrier (frame configuration type 1)," respectively.

Also, in each cell (carrier), 1 or both of a TTI having a relatively long time length (for example, 1 ms) (also referred to as a "subframe," a "normal TTI," a "long TTI," a "normal subframe," a "long subframe" a "slot," etc.) and a TTI having a relatively short time length (also referred to as a "short TTI," a "short subframe," a "slot," a "subslot" a "minislot," etc.) may be used. Also, in each cell, TTIs of different time lengths may co-exist.

Between the user terminals 20 and the radio base station 11, communication can be carried out using a carrier (referred to as, for example, an "existing carrier," a "legacy carrier" and so on) of a relatively low frequency band (for example, 2 GHz). Meanwhile, carriers of higher frequency bands than existing carriers (for example, 3.5 GHz, 5 GHz, 30 to 70 GHz, etc.), or carriers of the same frequency band as existing carriers may be used between the user terminal 20 and the radio base station 12. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between 2 radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmission/reception point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmission/reception points" and so on.

Also, the LTE base station (LTE eNB) shown in FIGS. 1 and 2 may be a radio base station 11 and/or a radio base station 12. Also, the NR base station (NR gNB) may be a radio base station 11 and/or a radio base station 12. Hereinafter the radio base stations 11 and 12 will be collectively referred to as "radio base stations 10," unless specified otherwise.

Each user terminal 20 is a terminal that supports one or more RATs such as at least one of LTE, LTE-A, NR, and 5G, and may be not limited to a mobile communication terminal, and may be a stationary communication terminal.

In the radio communication system 1, as radio access schemes, OFDMA (orthogonal Frequency Division Multiple Access) can be applied to the downlink (DL), and SC-FDMA (Single-Carrier Frequency Division Multiple Access) can be applied to the uplink (UL). OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system band into bands formed with 1 or continuous resource blocks per terminal, and allowing a plurality of terminals to use mutually different bands. Note that the uplink and downlink radio access schemes are not limited to the combinations of these, and OFDMA may be used in UL.

In the radio communication system 1, a DL data channel (PDSCH (Physical Downlink Shared CHannel), also referred to as a DL shared channel and/or the like), which is used by each user terminal 20 on a shared basis, a broadcast channel (PBCH (Physical Broadcast CHannel)), L1/L2 control channels and so on are used as DL channels. At least one of user data, higher layer control information, SIBs (System Information Blocks) and so forth is communicated in the PDSCH. Also, the MIB (Master Information Block) is communicated in the PBCH.

The L1/L2 control channels include DL control channels (such as PDCCH (Physical Downlink Control CHannel), EPDCCH (Enhanced Physical Downlink Control CHannel), etc., PCFICH (Physical Control Format Indicator CHannel), PHICH (Physical Hybrid-ARQ Indicator CHannel)) and so on. Downlink control information (DCI), including PDSCH and PUSCH scheduling information, is communicated by the PDCCH. The number of OFDM symbols to use for the PDCCH is communicated by the PCFICH. The EPDCCH is frequency-division-multiplexed with the PDSCH and used to communicate DCI and so on, like the PDCCH. PUSCH delivery acknowledgment information (also referred to as "A/N," "HARQ-ACK," "HARQ-ACK bit," "A/N codebook" and so on) can be communicated by using at least one of the PHICH, the PDCCH and the EPDCCH.

In the radio communication system 1, a UL data channel (also referred to as a "PUSCH (Physical Uplink Shared CHannel)," a "UL shared channel," "NR-PUSCH," and/or the like), which is used by each user terminal 20 on a shared basis, an UL control channel (PUCCH (Physical Uplink Control CHannel)), a random access channel (PRACH (Physical Random Access CHannel)) and so on are used as UL channels. User data, higher layer control information and so on are communicated by the PUSCH. Uplink control information (UCI), including at least one of PDSCH delivery acknowledgement information (A/N, HARQ-ACK, etc.), channel state information (CSI), a scheduling request (SR) and so on is communicated in the PUSCH or the PUCCH. By means of the PRACH, random access preambles for establishing connections with cells are communicated.

<Radio Base Station>

Figure 7:
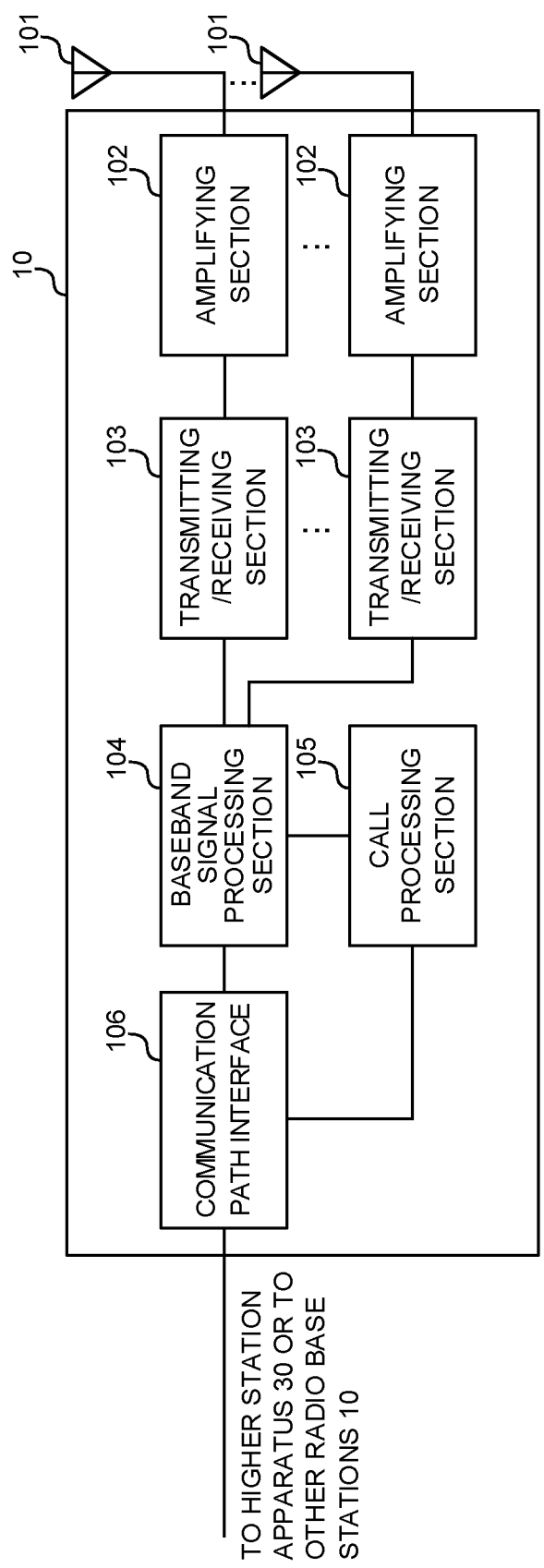
FIG. 7 is a diagram to show an exemplary overall structure of a radio base station according to the present embodiment.

FIG. 7 is a diagram to show an exemplary overall structure of a radio base station according to the present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided. The radio base station 10 may be either an LTE base station or an NR base station.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ (Hybrid Automatic Repeat reQuest) process), scheduling, transport format selection, channel coding, rate matching, scrambling, an inverse fast Fourier transform (IFFT) process and a precoding process, and the result is forwarded to each transmitting/receiving sections 103. Furthermore, downlink control signals are also subjected to transmission processes such as channel coding and an inverse fast Fourier transform, and forwarded to the transmitting/receiving sections 103.

Baseband signals that are pre-coded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101.

The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving sections 103 may be structured as a transmitting/receiving section in one entity, or may be constituted by a transmitting section and a receiving section.

Meanwhile, as for UL signals, radio frequency signals that are received in the transmitting/receiving antennas 101 are each amplified in the amplifying sections 102. The transmitting/receiving sections 103 receive the UL signals amplified in the amplifying sections 102. The received signals are converted into the baseband signal through frequency conversion in the transmitting/receiving sections 103 and output to the baseband signal processing section 104.

In the baseband signal processing section 104, UL data that is included in the UL signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 at least performs call processing such as setting up and releasing communication channels, manages the state of the radio base station 10 or manages the radio resources.

The communication path interface section 106 transmits and receives signals to and from the higher station apparatus 30 via a predetermined interface. Also, the communication path interface 106 may transmit and/or receive signals (backhaul signaling) with neighboring radio base stations 10 via a backhaul link (for example, an interface in compliance with the CPRI (Common Public Radio Interface), such as optical fiber, the X2 interface, etc.). In the present embodiment, the communication path interface 106 can constitute a transmission section and/or a receiving section that transmits and/or receives signals between other radio base stations 10.

Also, the transmitting/receiving sections 103 transmit DL signals (for example, at least one of DCI (DL assignment to schedule DL data, and/or UL grant to schedule UL data), DL data and DL reference signal) by using an LTE DL carrier and/or an NR DL carrier. Also, the transmitting/receiving sections 103 receive UL signals (for example, at least one of UL data, UCI, and UL reference signals) by using an LTE UL carrier and/or an NR UL carrier.

The DL signals may include LTE DL signals and/or NR DL signals. The UL signals may include LTE UL signals and/or NR UL signals. For example, the transmitting/receiving sections 103 may receive LTE UL signals and NR UL signals by using an LTE UL carrier (see FIGS. 3A and 3B), and receive a single UL signal in which an LTE UL signal and an NR UL signal are multiplexed (see FIG. 3C). Also, the transmitting/receiving sections 103 may transmit information about the multiplexing of LTE UL signals and NR UL signals (multiplexing information) to the user terminal 10 through higher layer signaling (for example, RRC signaling).

Also, the transmitting/receiving sections 103 receive delivery acknowledgement information (also referred to as "ACK/NACK," "A/N," "HARQ-ACK," "A/N codebook," etc.) in response to DL signals (LTE DL signal and/or NR DL signal). As to how often the retransmission control information is transmitted, for example, the retransmission control information may be transmitted per CBG, per TB or for every one or more TBs (that is, ACKs or NACKs may be indicated per CBG, per TB or for every one or more TBs). In addition, the transmitting/receiving sections 103 may transmit configuration information for the unit for retransmission of DL signals and/or UL signals.

Also, the communication path interface 106 of the LTE base station may transmit, a MAC signal, which carries UCI/UL data for NR, received on the LTE UL carrier, to the NR base station, via a backhaul link. Also, the communication path interface 106 of the LTE base station may transmit NR control information to the NR base station, via a backhaul link (for example, the X2 interface). The communication path interface 106 of the NR base station may receive MAC signals and/or NR control information, from the LTE base station, via a backhaul link.

Figure 8:
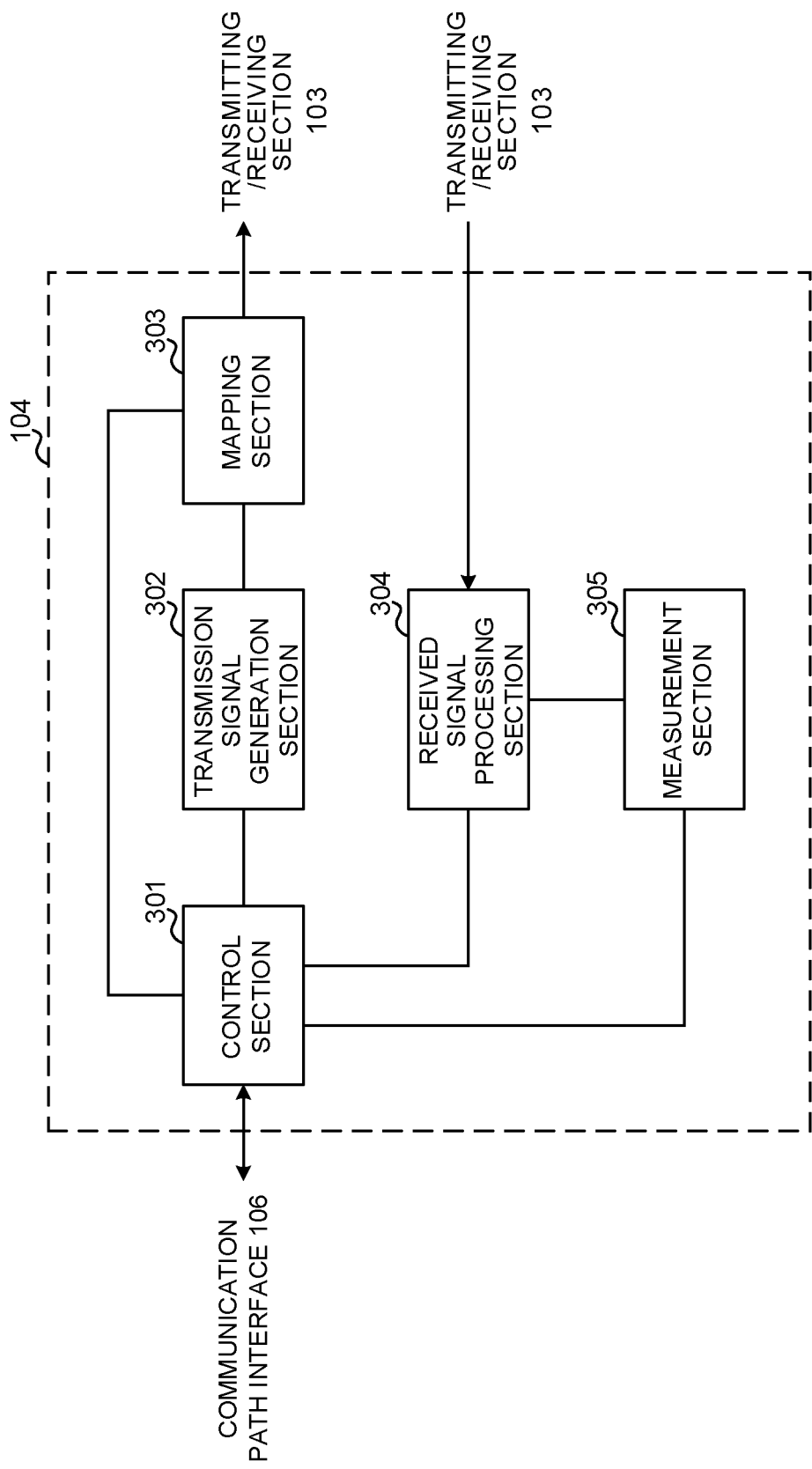
FIG. 8 is a diagram to show an exemplary functional structure of a radio base station according to the present embodiment.

FIG. 8 is a diagram to show an exemplary functional structure of a radio base station according to the present embodiment. Note that, although FIG. 8 primarily shows functional blocks that pertain to characteristic parts of the present embodiment, the radio base station 10 has other functional blocks that are necessary for radio communication as well. As shown in FIG. 8, the baseband signal processing section 104 has a control section 301, a transmission signal generation section 302, a mapping section 303, a received signal processing section 304 and a measurement section 305. Each MAC entity of the present embodiment may be constituted by at least one of a control section 301, a transmission signal generation section 302, and a received signal processing section 304.

The control section 301 controls the whole of the radio base station 10. The control section 301 controls, for example, at least one of generation of downlink signals in the transmission signal generation section 302, mapping of downlink signals in the mapping section 303, the receiving process (for example, demodulation) of uplink signals in the received signal processing section 304, and measurements in the measurement section 305.

To be more specific, the control section 301 controls the scheduling and/or transmission processes (for example, modulation, coding, transport block size (TBS) etc.) for DL signals based on UCI transmitted as feedback from the user terminal 20. Also, when the TBS exceeds a predetermined threshold, the control section 301 may apply code block segmentation to DL signals, whereby a TBS is divided into multiple CBs.

The control section 301 also controls the scheduling of UL signals based on UCI transmitted as feedback from the user terminal 20. The control section 301 also controls receiving process (for example, at least one of demodulation, decoding, and carrier demultiplexing) for the UL signals. For example, the control section 301 controls receiving process for LTE UL signal and NR UL signals by using an LTE UL carrier or an NR UL carrier (or a single UL signal in which an LTE UL signal and an NR UL signal are multiplexed).

Also, the control section 301 also controls the transfer of UL signals of other RATs, to the radio base stations 10 of these RATs. For example, the control section 301 of the LTE base station may control the generation of MAC signals carrying UCI/UL data for NR and the transmission of these to the NR base station. Also, the control section 301 of the NR base station may control the receipt of MAC signals by the communication path interface 106, and control the retransmission of NR DL signals and the scheduling of NR UL signals based on the MAC signals.

The control section 301 can be constituted by a controller, a control circuit or control apparatus that can be described based on general understanding of the technical field to which the present invention pertains.

The transmission signal generation section 302 may generate a DL signal (including at least one of DL data, DCI, a DL reference signal and control information that is provided by way of higher layer signaling) based on commands from the control section 301, and output this signal to the mapping section 303.

The transmission signal generation section 302 can be constituted by a signal generator, a signal generation circuit or signal generation apparatus that can be described based on general understanding of the technical field to which the present invention pertains.

The mapping section 303 maps the DL signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, at least one of demapping, demodulation, decoding, carrier demultiplexing, etc.) for UL signals transmitted from the user terminal 20. To be more specific, the received signal processing section 304 may output the received signals, the signals after the receiving processes and so on, to the measurement section 305. In addition, the received signal processing section 304 performs UCI receiving processes based on UL control channel configuration commanded from the control section 301.

Also, the measurement section 305 may measure the channel quality in UL based on, for example, the received power (for example, RSRP (Reference Signal Received Power)) and/or the received quality (for example, RSRQ (Reference Signal Received Quality)) of UL reference signals. The measurement results may be output to the control section 301.

(User Terminal)

Figure 9:
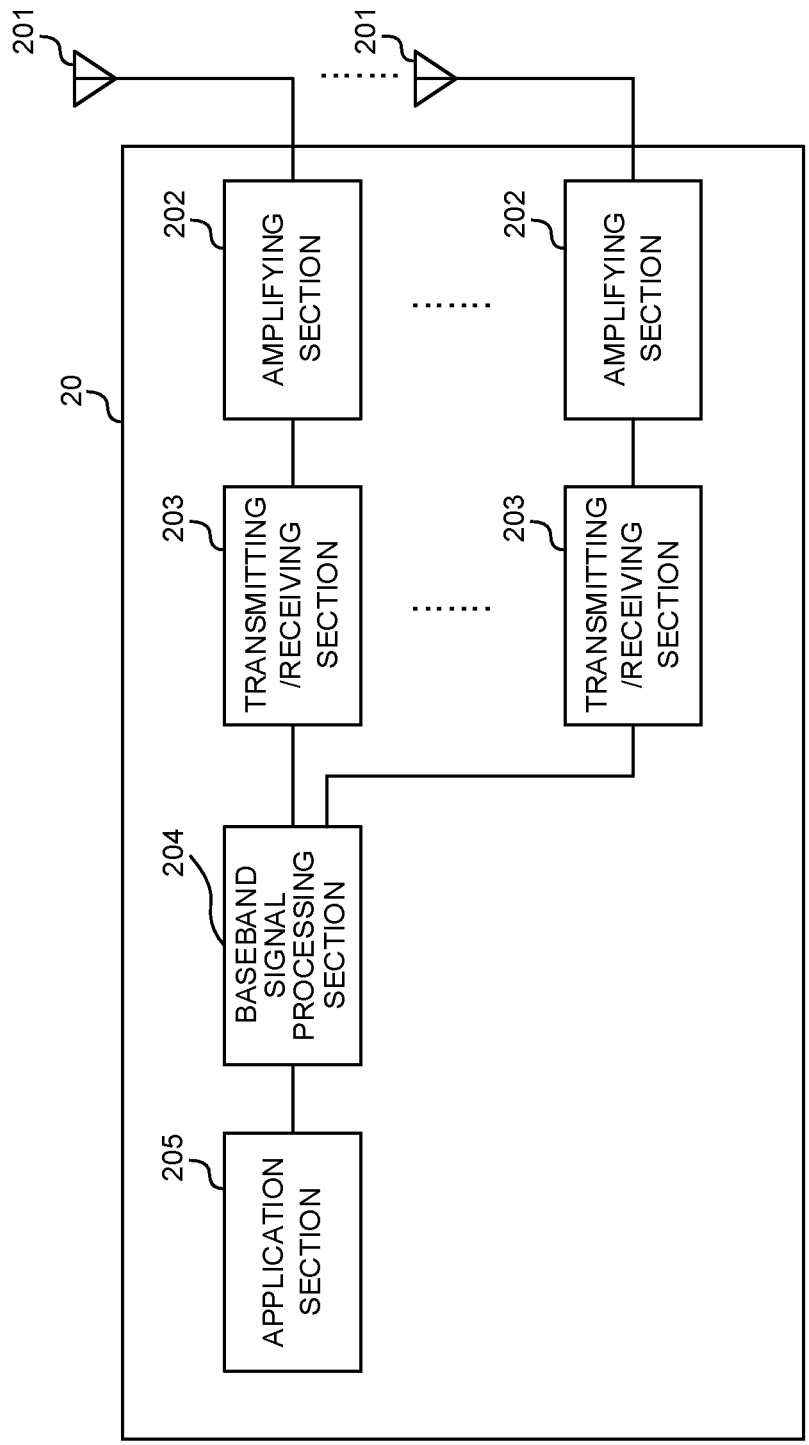
FIG. 9 is a diagram to show an exemplary overall structure of a user terminal according to the present embodiment.

FIG. 9 is a diagram to show an exemplary overall structure of a user terminal according to the present embodiment. A user terminal 20 has a plurality of transmitting/receiving antennas 201 for MIMO communication, amplifying sections 202, transmitting/receiving sections 203, a baseband signal processing section 204 and an application section 205. The user terminal 20 supports multiple RATs (for example LTE and NR).

Radio frequency signals that are received in a plurality of transmitting/receiving antennas 201 are each amplified in the amplifying sections 202. Each transmitting/receiving sections 203 receives the DL signals amplified in the amplifying sections 202. The received signals are subjected to frequency conversion and converted into the baseband signal in the transmitting/receiving sections 203, and output to the baseband signal processing section 204.

The baseband signal processing section 204 performs, for the baseband signal that is input, at least one of an FFT process, error correction decoding, a retransmission control receiving process and so on. The DL data is forwarded to the application section 205. The application section 205 performs processes related to higher layers above the physical layer and the MAC layer, and so on.

Meanwhile, UL data is input from the application section 205 to the baseband signal processing section 204. The baseband signal processing section 204 performs a retransmission control transmission process (for example, an HARQ transmission process), channel coding, rate matching, puncturing, a discrete Fourier transform (DFT) process, an IFFT process and so on, and the result is forwarded to each transmitting/receiving sections 203. UCI (including, for example, at least one of an A/N in response to a DL signal, channel state information (CSI) and a scheduling request (SR), and/or others) is also subjected to at least one of channel coding, rate matching, puncturing, a DFT process, an IFFT process and so on, and the result is forwarded to the transmitting/receiving sections 203.

Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Also, the transmitting/receiving sections 203 receive DL signals (for example, at least one of DCI (DL assignment for scheduling DL data, and/or UL grant for scheduling UL data), DL data, and DL reference signal) by using an LTE DL carrier and/or an NR DL carrier. Also, the transmitting/receiving sections 203 receive UL signals (for example, at least one of UL data, UCI and UL reference signals) by using an LTE UL carrier or an NR UL carrier.

This DL signal may include an LTE DL signal and/or an NR DL signal. This UL signal may include an LTE UL signal and/or an NR UL signal. For example, the transmitting/receiving section 203 may transmit LTE UL signals and NR UL signals by using an LTE UL carrier (see FIGS. 3A and 3B), or transmit a single UL signal, in which an LTE UL signal and an NR UL signal are multiplexed (see FIG. 3C). Also, the transmitting/receiving sections 203 may receive information (multiplexing information) about the multiplexing of LTE UL signals and NR UL signals through higher layer signaling (for example, RRC signaling).

Also, the transmitting/receiving sections 203 transmit delivery acknowledgement information (also referred to as "ACK/NACK," "A/N," "HARQ-ACK," "A/N codebook," etc.) in response to DL signals (LTE DL signal and/or NR DL signal). As to how often the retransmission control information is transmitted, for example, the retransmission control information may be transmitted per CBG, per TB or for every one or more TBs (that is, ACKs or NACKs may be indicated per CBG, per TB or for every one or more TBs). In addition, the transmitting/receiving sections 203 may receive configuration information for the unit for retransmission of DL signals and/or UL signals.

The transmitting/receiving sections 203 can be constituted by transmitters/receivers, transmitting/receiving circuits or transmitting/receiving apparatus that can be described based on general understanding of the technical field to which the present invention pertains. Furthermore, a transmitting/receiving section 203 may be structured as 1 transmitting/receiving section, or may be formed with a transmitting section and a receiving section.

Figure 10:
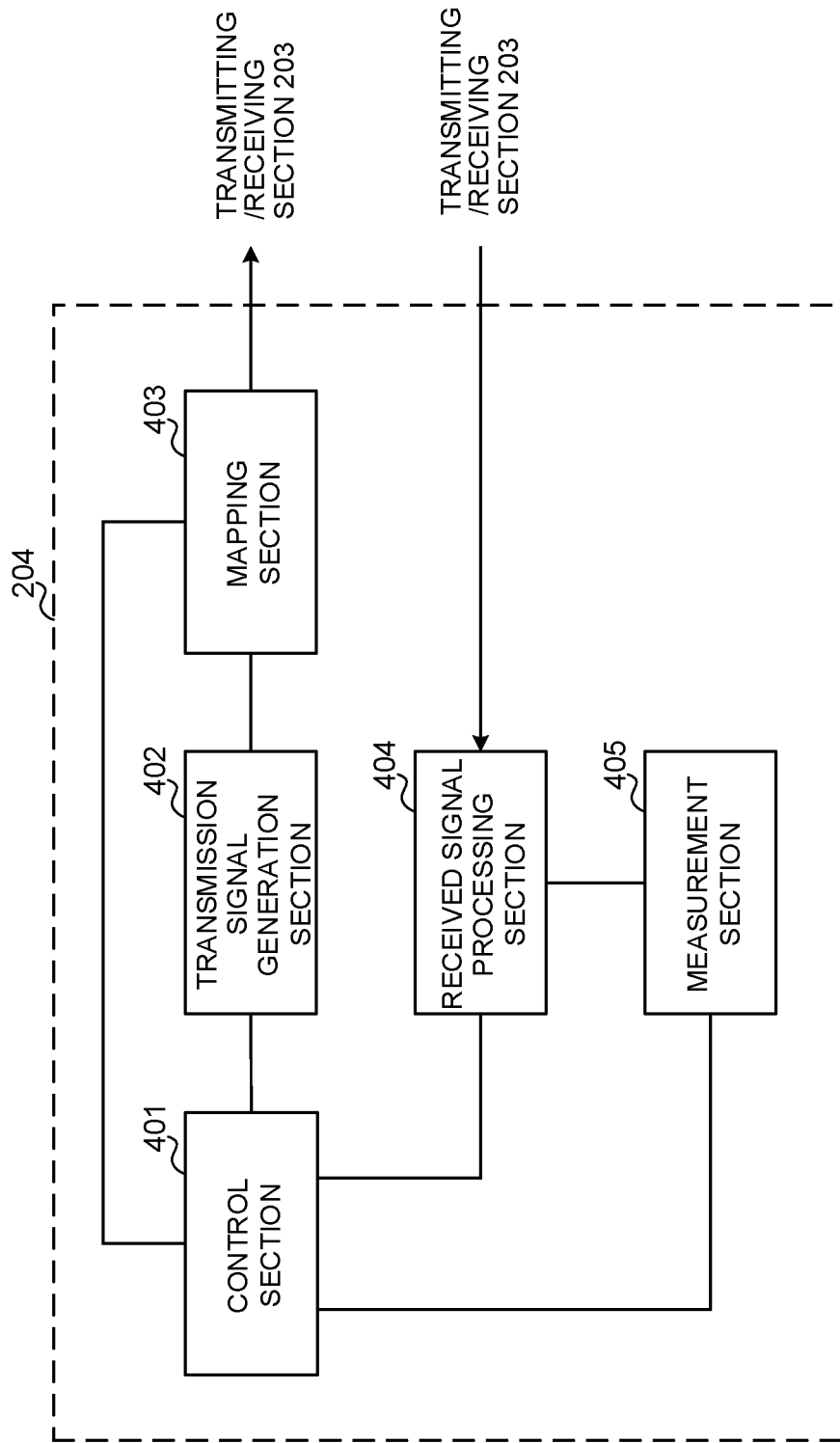
FIG. 10 is a diagram to show an exemplary functional structure of a user terminal according to the present embodiment.

FIG. 10 is a diagram to show an exemplary functional structure of a user terminal according to the present embodiment. Note that, although FIG. 10 primarily shows functional blocks that pertain to characteristic parts of the present embodiment, the user terminal 20 has other functional blocks that are necessary for radio communication as well.

As shown in FIG. 10, the baseband signal processing section 204 provided in the user terminal 20 has a control section 401, a transmission signal generation section 402, a mapping section 403, a received signal processing section 404 and a measurement section 405. Each MAC entity of the present embodiment may be constituted by at least one of a control section 301, a transmission signal generation section 302, and a received signal processing section 304.

The control section 401 controls the whole of the user terminal 20. The control section 401 controls, for example, at least one of generation of UL signals in the transmission signal generation section 402, mapping of UL signals in the mapping section 403, the receiving process of DL signals in the received signal processing section 404 and measurements in the measurement section 405.

To be more specific, the control section 401 controls receiving processes for DL signals in the received signal processing section 404 (for example, demodulation, decoding, each carrier's demultiplexing, etc.) based on DCI (DL assignment).

Also, the control section 401 controls the generation and transmission processes (for example, encoding, modulation, mapping etc.) of UL signals based on DCI (UL grant). For example, the control section 401 may control the frequency division multiplexing and/or the time division multiplexing of both LTE UL signals (first UL signals) and NR UL signals (second UL signals) in an LTE UL carrier (FIGS. 3A and 3B). Furthermore, the control section 401 may also control the multiplexing of an LTE UL signal and an NR UL signal over a single UL signal in the LTE UL carrier (FIG. 3C).

Furthermore, when an LTE UL signal and an LTE UL signal are multiplexed over a single UL signal in the LTE UL carrier, the control section 401 may control the granularity of retransmission of NR DL signals. For example, the control section 401 may control the granularity of NR A/Ns based on TBs, as with LTE A/Ns, or the control section 401 may control the granularity of NR A/Ns based on CBGs, unlike LTE A/Ns. Also, the control section 401 may control bundling of NR A/Ns and/or LTE A/Ns.

Also, the control section 401 may also control the transmission power of UL signals. For example, the control section 401 may control the transmission power of LTE UL signals, transmitted in the LTE UL carrier, based on the path loss of the LTE carrier. For example, the control section 401 may control the transmission power of LTE UL signals, transmitted in the LTE UL carrier, based on the path loss of the LTE carrier.

Also, the control section 401 may control the priority of UCI for LTE and/or UCI for NR.

Also, the control section 401 may control the sharing and/or reporting of states among multiple MAC entities provided for a particular carrier (also referred to as a "frequency," a "cell group," a "CC," etc.) (see FIG. 5).

The control section 401 can be constituted by a controller, a control circuit or control apparatus that can be described based on general understanding of the technical field to which the present invention pertains.

The transmission signal generation section 402 generates delivery acknowledgment information in response to UL signals and DL signals as commanded from the control section 401 (including performing encoding, rate matching, puncturing, modulation and/or other processes), and outputs this to the mapping section 403. The transmission signal generation section 402 can be constituted by a signal generator, a signal generation circuit or signal generation apparatus that can be described based on general understanding of the technical field to which the present invention pertains.

The mapping section 403 maps delivery acknowledgment information for UL signals and DL signals generated in the transmission signal generation section 402 to radio resources, as commanded from the control section 401, and outputs these to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes for DL signals (for example, demapping, demodulation, decoding, etc.). For example, the received signal processing section 404 may perform the decoding process on a per CB basis as commanded from the control section 401, and output the decoding result of each CB to the control section 401.

The received signal processing section 404 outputs the information received from the radio base station 10, to the control section 401. The received signal processing section 404 outputs, for example, broadcast information, system information, higher layer control information by higher layer signaling such as RRC signaling, L1/L2 control information (for example, UL grant, DL assignment, etc.) and so on to the control section 401.

The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The measurement section 405 measures channel states based on reference signals (for example, CSI-RS) from the radio base station 10, and outputs the measurement results to the control section 401. Note that the channel state measurements may be conducted per CC.

The measurement section 405 can be constituted by a signal processor, a signal processing circuit or signal processing apparatus, and a measurer, a measurement circuit or measurement apparatus that can be described based on general understanding of the technical field to which the present invention pertains.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting 2 or more physically and/or logically separate pieces of apparatus (via wire and/or wireless, for example) and using these multiple pieces of apparatus.

Figure 11:
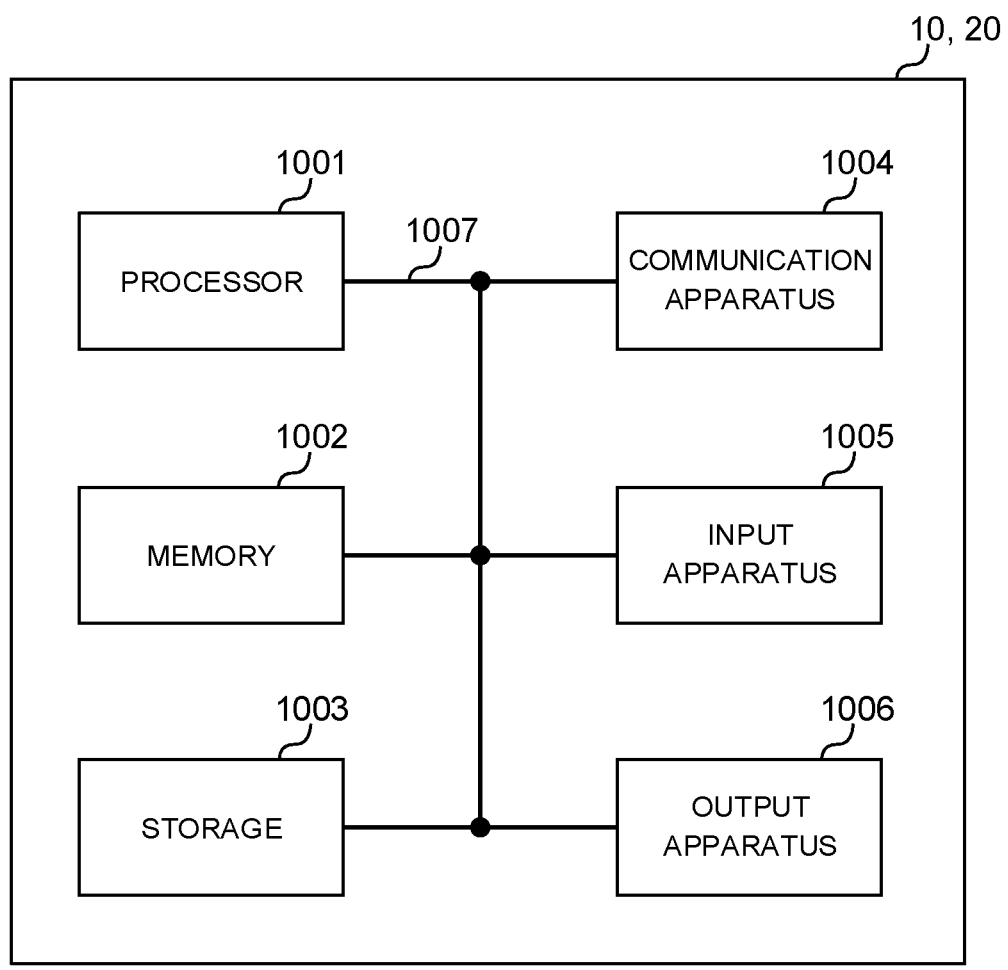
FIG. 11 is a diagram to show an exemplary hardware structure of a radio base station and a user terminal according to the present embodiment.

For example, the radio base station, user terminals and so on according to embodiments of the present invention may function as a computer that executes the processes of the radio communication method of the present invention. FIG. 11 is a diagram to show an exemplary hardware structure of a radio base station and a user terminal according to the present embodiment. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only 1 processor 1001 is shown, a plurality of processors may be provided. Furthermore, processes may be implemented with 1 processor, or processes may be implemented in sequence, or in different manners, on one or more processors. Note that the processor 1001 may be implemented with one or more chips.

Each function of the radio base station 10 and user terminal 20 is implemented by allowing predetermined software (programs) to be read on hardware such as the processor 1001 and the memory 1002, and by a least one of allowing the processor 1001 to do calculations, the communication apparatus 1004 to communicate, and the memory 1002 and the storage 1003 to read and/or write data.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and others may be implemented by the processor 1001.

Furthermore, the processor 1001 reads programs (program codes), software modules, data and so forth from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory (primary storage apparatus)" and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Also, each device shown in FIG. 11 is connected by a bus 1007 for communicating information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals" (or "signaling"). Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. A subframe may be a fixed time duration (for example, 1 ms) not dependent on the numerology.

A slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a plurality of minislots. Each minislot may be comprised of one or more symbols in the time domain.

A radio frame, a subframe, a slot, a minislot and a symbol all represent the time unit in signal communication. A radio frame, a subframe, a slot, a minislot and a symbol may be each called by other applicable names. For example, 1 subframe may be referred to as a "transmission time interval (TTI)," or a plurality of consecutive subframes may be referred to as a "TTI," or 1 slot or mini-slot may be referred to as a "TTI." That is, a subframe and/or a TTI may be a subframe (1 ms) in existing LTE, may be a shorter period than 1 ms (for example, 1 to 13 symbols), or may be a longer period of time than 1 ms.

Here, a TTI refers to the minimum time unit of scheduling in radio communication, for example. For example, in LTE systems, a radio base station schedules the radio resources (such as the frequency bandwidth and/or transmission power that can be used in each user terminal) to allocate to each user terminal in TTI units. Note that the definition of TTIs is not limited to this. The TTI may be the transmission time unit of channel-encoded data packets (transport blocks), code blocks and/or codewords, or may be the unit of processing in scheduling, link adaptation and so on. Note that, when 1 slot or 1 minislot is referred to as a "TTI," one or more TTIs (that is, one or multiple slots or one or more minislots) may be the minimum time unit of scheduling. Also, the number of slots (the number of minislots) to constitute this minimum time unit of scheduling may be controlled.

A TTI having a time duration of 1 ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," a "partial TTI" (or a "fractional TTI"), a "shortened subframe," a "short subframe," and so on.

A resource block (RB) is the unit of resource allocation in the time domain and the frequency domain, and may include one or a plurality of consecutive subcarriers in the frequency domain. Also, an RB may include one or more symbols in the time domain, and may be 1 slot, 1 minislot, 1 subframe or 1 TTI in length. 1 TTI and 1 subframe each may be comprised of one or more resource blocks. Note that an RB may be referred to as a "physical resource block (PRB (Physical RB))," a "PRB pair," an "RB pair," and so on.

Furthermore, a resource block may be comprised of one or more resource elements (REs). For example, 1 RE may be a radio resource field of 1 subcarrier and 1 symbol.

Note that the structures of radio frames, subframes, slots, minislots, symbols and so on described above are simply examples. For example, configurations pertaining to the number of subframes included in a radio frame, the number of slots included in a subframe or a radio frame, the number of mini-slots included in a slot, the number of symbols included in a slot or a mini-slot, the number of subcarriers included in an RB, the number of symbols in a TTI, the duration of symbols, the duration of cyclic prefixes (CPs) and so on can be changed in a variety of ways.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, a memory), or may be managed using a management table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI), uplink control information (UCI)), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information, or by reporting a different piece of information).

Decisions may be made in values represented by 1 bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, 3) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may also be referred to as, for example, a "subscriber station," a "mobile unit," a "subscriber unit," a "wireless unit," a "remote unit," a "mobile device," a "wireless device," a "wireless communication device," a "remote device," a "mobile subscriber station," an "access terminal," a "mobile terminal," a "wireless terminal," a "remote terminal," a "handset," a "user agent," a "mobile client," a "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, "uplink" and/or "downlink" may be interpreted as "sides." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by higher nodes (upper nodes). In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the examples/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark) and other adequate radio communication methods, and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method of distinguishing between 2 or more elements. In this way, reference to the first and second elements does not imply that only 2 elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between 2 or more elements, and may include the presence of one or more intermediate elements between 2 elements that are "connected" or "coupled" to each other. The coupling or connection between the elements may be physical, logical or a combination thereof. As used herein, 2 elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency fields, microwave regions and optical (both visible and invisible) regions.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
   a processor that, when a dual connectivity using a first Radio Access Technology (RAT) and a second RAT is configured, determines allocation, in a frequency range used in the second RAT, of a first uplink (UL) signal in the first RAT and a second UL signal in the second RAT; and
   a transmitter that transmits, using the frequency range used in the second RAT, the first UL signal and the second UL signal,
   wherein multiple medium access control (MAC) entities are configured for the terminal.

2. The terminal according to claim 1, wherein the processor controls not to transmit the second UL signal in a time domain in which the first UL signal is transmitted.

3. The terminal according to claim 1, wherein the processor controls to transmit the first UL signal and the second UL signal in a time domain including a same time domain.

4. A radio communication method comprising:
   when a dual connectivity using a first Radio Access Technology (RAT) and a second RAT is configured, determining allocation, in a frequency range used in the second RAT, of a first uplink (UL) signal in the first RAT and a second UL signal in the second RAT; and
   transmitting, using the frequency range used in the second RAT, the first UL signal and the second UL signal,
   wherein multiple medium access control (MAC) entities are configured for a terminal.

5. A base station comprising:
   a processor that when a dual connectivity using a first Radio Access Technology (RAT) and a second RAT is configured, controls allocation, in a frequency range used in the second RAT, of a first uplink (UL) signal in the first RAT and a second UL signal in the second RAT; and a receiver that receives the first UL signal and the second UL signal transmitted using the frequency range used in the second RAT, wherein multiple medium access control (MAC) entities are configured for a terminal.

* * * * *